(12) United States Patent
Deng et al.

(10) Patent No.: US 11,514,446 B2
(45) Date of Patent: Nov. 29, 2022

(54) METHOD AND APPARATUS FOR STARTING SMART CONTRACT, ELECTRONIC DEVICE, AND STORAGE MEDIUM

(71) Applicant: Alipay (Hangzhou) Information Technology Co., Ltd., Zhejiang (CN)

(72) Inventors: Fuxi Deng, Zhejiang (CN); Changzheng Wei, Zhejiang (CN); Yongqiang Li, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/364,671

(22) Filed: Jun. 30, 2021

(65) Prior Publication Data

US 2022/0067715 A1 Mar. 3, 2022

(30) Foreign Application Priority Data

Aug. 31, 2020 (CN) .......................... 202010899211.9

(51) Int. Cl.
*G06Q 20/38* (2012.01)
*G06Q 20/40* (2012.01)

(52) U.S. Cl.
CPC ....... *G06Q 20/389* (2013.01); *G06Q 20/3825* (2013.01); *G06Q 20/3827* (2013.01); *G06Q 20/401* (2013.01)

(58) Field of Classification Search
None
See application file for complete search history.

(56) References Cited

U.S. PATENT DOCUMENTS

| | | | |
|---|---|---|---|
| 10,594,477 B2 | 3/2020 | Shao et al. | |
| 2017/0337534 A1* | 11/2017 | Goeringer | G06Q 50/184 |
| 2018/0137465 A1* | 5/2018 | Batra | H04L 67/104 |
| 2019/0019180 A1* | 1/2019 | Coburn | H04L 9/0637 |
| 2019/0363884 A1* | 11/2019 | Johnson | H04L 63/123 |
| 2019/0392407 A1* | 12/2019 | Keskar | G06Q 50/186 |
| 2020/0074516 A1 | 3/2020 | Yamakado et al. | |
| 2020/0111092 A1* | 4/2020 | Wood | G06Q 40/04 |

(Continued)

FOREIGN PATENT DOCUMENTS

| | | |
|---|---|---|
| CN | 106897878 A | 6/2017 |
| CN | 107886329 A | 4/2018 |

(Continued)

OTHER PUBLICATIONS

"Dave Sag, Testing time-dependent logic in Ethereum Smart Contracts, Feb. 25, 2018, https://medium.com/coinmonks/testing-time-dependent-logic-in-ethereum-smart-contracts-1b24845c7f72" (Year: 2018).*

*Primary Examiner* — Christopher Bridges
*Assistant Examiner* — Toan Duc Bui
(74) *Attorney, Agent, or Firm* — Seed IP Law Group LLP

(57) ABSTRACT

One or more implementations of the present specification provide a method and apparatus for starting a smart contract, an electronic device, and a storage medium. The method is applied in a blockchain node, and can include: running a timing start logic defined in a chain code, the timing start logic configured to determine a start moment of a target smart contract, and start the target smart contract when a current moment reaches the start moment.

20 Claims, 6 Drawing Sheets

(56) References Cited

U.S. PATENT DOCUMENTS

| | | | |
|---|---|---|---|
| 2020/0175508 A1 | 6/2020 | Yamakado et al. | |
| 2020/0210402 A1* | 7/2020 | Hu | H04L 9/50 |
| 2021/0174432 A1* | 6/2021 | Gonnaud | G06Q 20/02 |
| 2021/0318897 A1* | 10/2021 | Wei | H04L 9/3239 |

FOREIGN PATENT DOCUMENTS

| | | |
|---|---|---|
| CN | 110659887 A | 1/2020 |
| CN | 110688634 A | 1/2020 |
| CN | 110704490 A | 1/2020 |
| CN | 110992020 A | 4/2020 |
| CN | 111367621 A | 7/2020 |

* cited by examiner

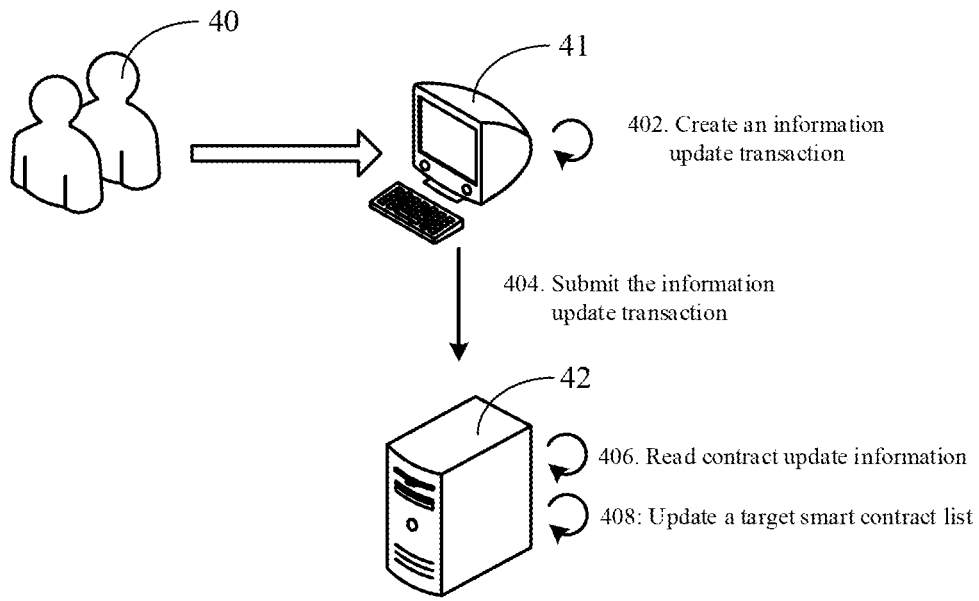
Fig. 3
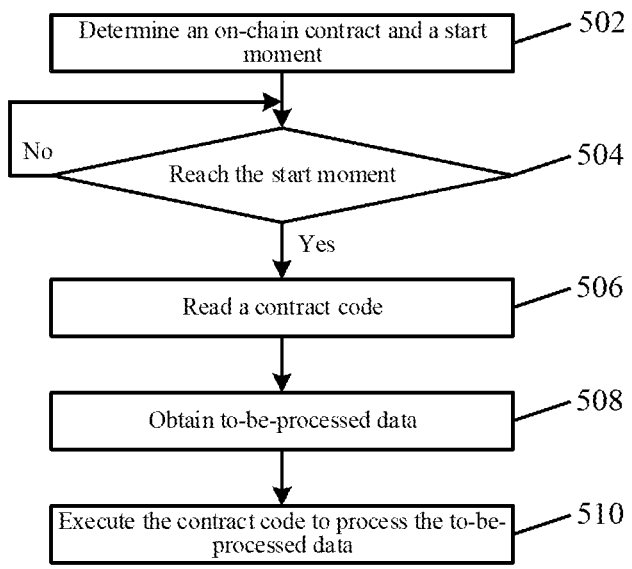
Fig. 4
Fig. 5

METHOD AND APPARATUS FOR STARTING SMART CONTRACT, ELECTRONIC DEVICE, AND STORAGE MEDIUM

BACKGROUND

Technical Field

One or more implementations of the present specification relate to the field of blockchain technologies, and in particular, to a method and apparatus for starting a smart contract, an electronic device, and a storage medium.

Description of the Related Art

Blockchain technology (also known as distributed ledger technology) is a decentralized distributed database technology with various features such as being decentralized, open and transparent, tamper-resistant, and trustworthy, and is applicable to many application scenarios with high demands for data reliability.

BRIEF SUMMARY

One or more implementations of the present specification provide a method and apparatus for starting a smart contract, an electronic device, and a storage medium.

One or more implementations of the present specification provide the following technical solutions:

According to a first aspect of one or more implementations of the present specification, a method for starting a smart contract is provided and applied in a blockchain node, and the method includes: running a timing start logic defined in a chain code, the timing start logic configured to determine a start moment of a target smart contract, and start the target smart contract when a current moment reaches the start moment.

According to a second aspect of one or more implementations of the present specification, an apparatus for starting a smart contract is provided and applied in a blockchain node, and the apparatus includes: a running unit, configured to: run a timing start logic defined in a chain code, the timing start logic configured to determine a start moment of a target smart contract, and start the target smart contract when a current moment reaches the start moment.

According to a third aspect of one or more implementations of the present specification, an electronic device is provided, including: a processor; and a memory configured to store an executable instruction of the processor; the processor implementing the method according to the first aspect by running the executable instructions.

According to a fourth aspect of one or more implementations of the present specification, a computer readable storage medium is provided, where computer instructions are stored on the computer readable storage medium, and the instructions are executed by a processor to implement the steps of the method according to the first aspect.

BRIEF DESCRIPTION OF THE SEVERAL VIEWS OF THE DRAWINGS

FIG. 3 is a flowchart illustrating a method for starting a smart contract according to an example implementation.

FIG. 4 is an interaction diagram of maintaining a target smart contract list according to an example implementation.

FIG. 5 is a flowchart illustrating a method for starting an on-chain contract according to an example implementation.

DETAILED DESCRIPTION

Figure 1:
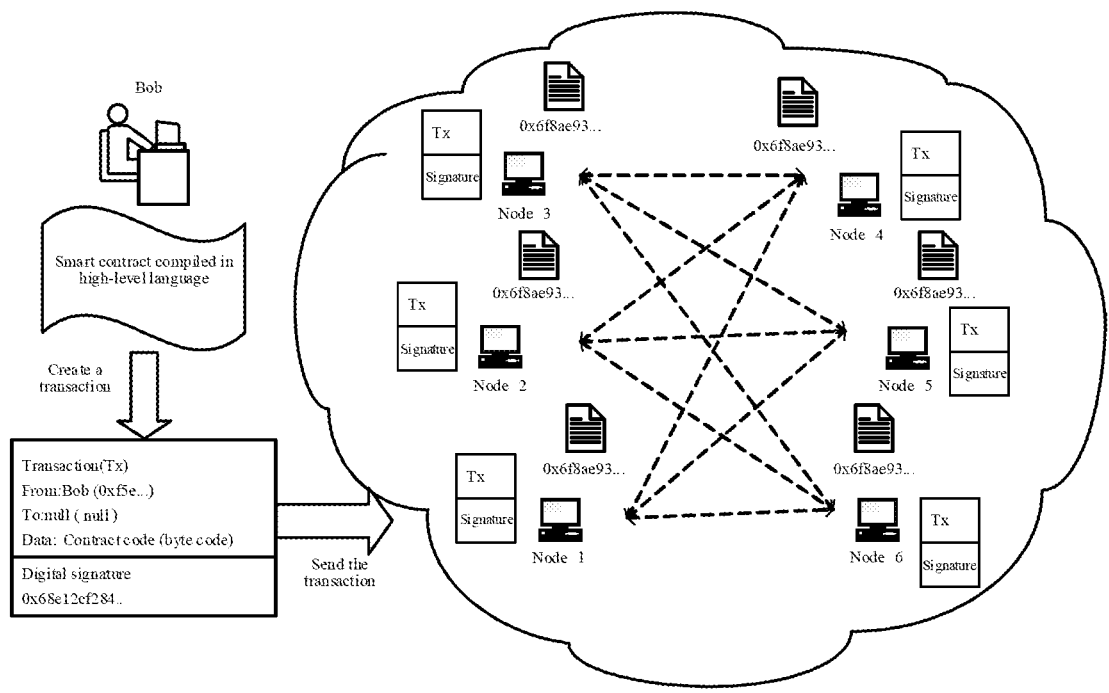
FIG. 1 is a schematic diagram of creating a smart contract according to an example implementation.

Example implementations are described in detail herein, and examples of the example implementations are presented in the accompanying drawings. When the following descriptions relate to the accompanying drawings, unless specified otherwise, same numbers in different accompanying drawings represent same or similar elements. Implementations described in the following example implementations do not represent all implementations consistent with one or more implementations of the present specification. On the contrary, the implementations are merely examples of apparatuses and methods that are described in the appended claims in details and consistent with some aspects of one or more implementations of the present specification.

It should be noted that, in other implementations, steps of a corresponding method are not necessarily performed according to a sequence shown and described in the present specification. In some other implementations, the method can include more or fewer steps than those described in the present specification. In addition, individual steps described in the present specification can be broken down into multiple steps in other implementations for description. However, the multiple steps described in the present specification can also be combined into a single step for description in other implementations.

A blockchain network is generally classified into three types: a public blockchain, a private blockchain, and a consortium blockchain. In addition, there are several types of combinations, such as private blockchain+consortium blockchain and consortium blockchain+public blockchain. The public blockchain has the highest degree of de-centralization. Representative public blockchains include Bitcoin and Ethereum. Participants who join the public blockchain can read on-chain data records, participate in transactions, and compete for accounting rights of new blocks. Furthermore, each participant (i.e., blockchain node) can freely join and exit the network and perform related operations. Conversely, a write right of the private blockchain network is controlled by a certain organization or institution, and a data reading right is specified by the organization. In short, the private blockchain can be a weak centralization system, has a relatively smaller number of participant nodes and stricter limitations on participating nodes. This type of blockchain is more suitable for internal use within a specific organization. The consortium blockchain is a blockchain balanced between the public blockchain and the private blockchain, and can be "partially decentralized." Each node in the consortium blockchain usually has a corresponding entity institution or organization. Participants join the network through authorization and form interest-related consortiums to jointly maintain blockchain operation.

In the related technologies, all of the public blockchain, the private blockchain, and the consortium blockchain can provide functions of a smart contract. The smart contract on the blockchain is a contract that can be triggered by a transaction on the blockchain system. The smart contract is defined in the form of codes.

Taking an account model (for example, Ethereum) as an example, a blockchain account can include an external account, a contract account, etc. The external account is usually owned by a user (an individual or an institution), while the contract account corresponds to the smart contract deployed in the blockchain. The structures of various accounts are similar, and can include fields such as Balance, Nonce, Code, and Storage. The Balance field is used to maintain the current account balance; the Nonce field is used to maintain the number of transactions of the account, and is a counter used to ensure that each transaction can be processed only once, effectively avoiding replay attacks; the Code field is used to maintain the contract code of the account (therefore, the Code field of the external account is usually null); in practice, the Code field usually maintains only the hash value of the contract code; therefore, the Code field is also commonly referred to as a Codehash field; and the Storage field is used to maintain the storage content of the account (the default field value is null). For the contract account, an independent storage space is usually allocated to store the content of the contract account. The independent storage space is commonly referred to as the account storage of the contract account. The storage content of the contract account usually constructs a data structure of a Merkle Patricia Trie (MPT) tree and is stored in the above-mentioned independent storage space. An MPT tree constructed based on the storage content of the contract account is usually referred to as a Storage tree. The Storage field usually maintains only the root node of the Storage tree. Therefore, the Storage field is also commonly referred to as a StorageRoot field.

An Ethereum virtual machine (EVM) is the core of Ethereum, which is a programmable blockchain, and each Ethereum node can run the EVM. The EVM is a Turing-complete virtual machine, through which various complex logics can be implemented. The user broadcasts and invokes the smart contract actually on the EVM in Ethereum. In fact, the virtual machine directly runs a virtual machine code (virtual machine bytecode, or "bytecode" for short). The smart contract has a deployment phase and an invoking phase.

In the deployment phase, the user sends a transaction that includes information about creating a smart contract to Ethereum. The "data" field of the transaction includes a code (such as a bytecode) of the smart contract. The "to" field of the transaction is null. Each node in the Ethereum network performs this transaction by using the EVM, and generates a corresponding contract instance. After consensus is reached among nodes by using a consensus mechanism, the smart contract corresponding to the transaction is successfully created, and a contract account corresponding to the smart contract appears on the blockchain. The contract account has a specific contract address, a contract code (that is, a code of the smart contract), or a hash value of the contract code is stored in the contract account, and the contract code is used to control behavior of the corresponding smart contract.

As shown in FIG. 1, after "Bob" sends a transaction containing information about creating a smart contract to an Ethereum network, an EVM of node 1 can execute the transaction and generate a corresponding contract instance. In FIG. 1, "0x6f8ae93 . . . " represents an address of the contract. The "data" field of the transaction can save a bytecode. The "to" field of the transaction is null. After consensus is reached among nodes through a consensus mechanism, the contract is successfully created and can be invoked in a subsequent process. After the contract is created, a contract account corresponding to the smart contract appears on the blockchain and has a specific address, and a contract code is stored in the contract account. The behavior of the smart contract is controlled by the contract code. In other words, the smart contract causes a virtual account including the contract code and account storage to be generated on the blockchain.

In the invoking phase, a user (which can be the same or different from the user deploying the smart contract) sends a transaction used to invoke a smart contract to the Ethereum network, where the "from" field of the transaction is an address of an external account corresponding to the user, the "to" field is a contract address of the smart contract that needs to be invoked, and the "data" field includes a method and input parameter data for invoking the smart contract. After consensus is reached among the nodes by using the consensus mechanism, the invoked smart contract as declared by the transaction is independently executed on each node of the Ethereum network in a specified method, and all execution records and data are stored in the blockchain. Therefore, after the transaction is completed, transaction records that cannot be tampered with and will not get lost are stored in the blockchain.

Figure 2:
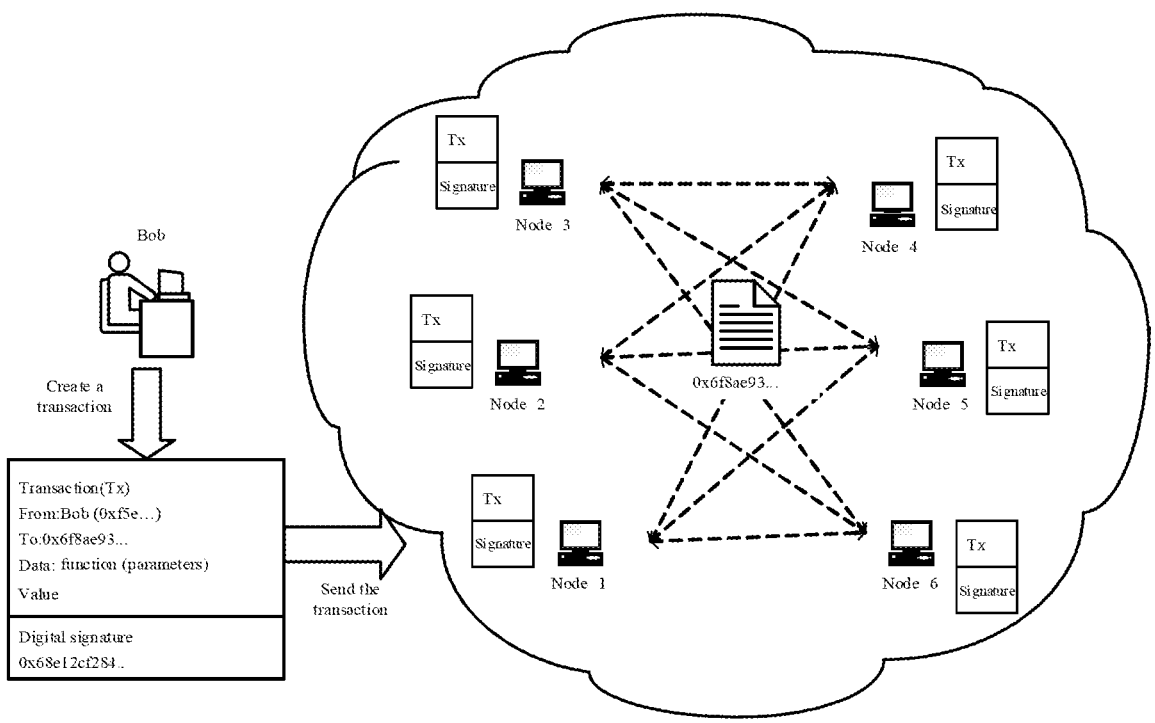
FIG. 2 is a schematic diagram of invoking a smart contract according to an example implementation.

As shown in FIG. 2, Ethereum is still used as an example. After "Bob" sends a transaction for invoking a smart contract to an Ethereum network, an EVM of a node can execute the transaction and generate a corresponding contract instance. In FIG. 2, the "from" field of the transaction is an address of an account of a transaction initiator (that is, "Bob"), "0x6f8ae93 . . . " in the "to" field represents an address of the invoked smart contract, the "value" field is an ETH value in Ethereum, and the "data" field of the transaction stores a method and a parameter for invoking the smart contract.

It can be understood that a smart contract on a blockchain network in the related technology is executed only when a contract invoker invokes the smart contract. That is, in the related technology, a blockchain node is triggered, by using a transaction, to execute the smart contract, and the blockchain node cannot proactively start execution of the smart contract. However, in practical applications, there can be a need to proactively start a smart contract. For example, a blockchain node in a blockchain network can proactively start a smart contract at a timing moment, so as to complete a timing task by proactively executing the smart contract at a timing moment. To this end, the present specification is intended to provide a technical solution for starting a smart contract for proactively starting a smart contract.

Referring to FIG. 3, FIG. 3 is a flowchart illustrating a method for starting a smart contract according to an example implementation. As shown in FIG. 3, the method is applied in a blockchain node and can include the following steps:

Step 302: Run a timing start logic defined in a chain code, the timing start logic being configured to determine a start moment of a target smart contract, and to start the target smart contract when a current moment reaches the start moment.

In this implementation, when a blockchain network is built, a chain code of the blockchain network can be configured in a node device, so the node device runs the chain code as a blockchain node in the blockchain network. In order that the blockchain node can proactively start a smart contract deployed on the blockchain network, and does not need to execute the smart contract by responding to a received blockchain transaction used to invoke the smart contract, a timing start logic can be defined in the chain code of the blockchain network in advance. In this case, the blockchain node can complete the above operation of proactively starting the smart contract at a timing moment by using the timing start logic when executing the chain code.

For example, the timing start logic can be configured to determine a start moment of the target smart contract, and start the target smart contract when the current moment reaches the start moment. The target smart contract can be understood as a smart contract that the blockchain node can proactively start at a timing moment, and a contract code used to complete a timing task is defined in the smart contract. For example, the timing task can be an operation such as timing remittance, timing distribution of virtual rights and interests to a specified user, or a timing reminder. Taking timing transfer as an example, an account address of a blockchain account of a remitter, an account address of a blockchain account of a remittee, and a remittance amount per time can be defined in a contract code of the target smart contract. It should be noted that the target smart contract can still be deployed to the blockchain network in the above related technology.

It can be understood that the blockchain node proactively starts the smart contract at a timing moment to complete the timing task, so an initiator of the timing task does not need to submit a blockchain transaction at a timing moment to the blockchain network to invoke the smart contract. On one hand, the blockchain node does not need to receive a blockchain transaction invoking the smart contract, so the blockchain node can reduce operations, for example, consensus, anti-replay check, and anti-double-spending check, of processing the blockchain transaction invoking the target smart contract, resource consumption of the blockchain node can be reduced, and efficiency of completing the timing task can be improved. On the other hand, the blockchain network automatically starts the smart contract to complete the timing task, thereby simplifying operations of the initiator of the timing task and improving user experience.

In this implementation, the blockchain node runs the chain code to determine a smart contract that needs to be proactively started at a timing moment, for example, the target smart contract.

In an implementation, information about the target smart contract can be recorded in the chain code, that is, the information about the target smart contract is written into the chain code when the chain code is developed. For example, a contract address of the target smart contract can be written into the chain code. Based on the information about the target smart contract recorded in the chain code, the blockchain node can determine the target smart contract by running the chain code. By recording the information about the target smart contract in the chain code, the information about the target smart contract can be effectively prevented from being maliciously tampered with.

In an implementation, the information about the target smart contract (there can be multiple target smart contracts) can be recorded in a specific predetermined blockchain account, and information about the predetermined blockchain account is recorded in the chain code, that is, the information about the predetermined blockchain account is written into the chain code when the chain code is developed. For example, the contract address of the target smart contract can be recorded in the predetermined blockchain account, and an account address of the predetermined blockchain account is written into the chain code. Based on the information about the predetermined blockchain account recorded in the chain code, the blockchain node can determine the blockchain account by running the chain code, so as to read the contract address of the target smart contract from the blockchain account. By using the above method of recording the target smart contract by using the blockchain account, it is convenient to update a list of smart contracts that need to be proactively started at a timing moment, so the blockchain network is controlled to complete the timing task more flexibly.

For example, an information update transaction that is used to update the information about the target smart contract recorded in the predetermined blockchain account can be submitted to the blockchain network, where the information update transaction includes contract update information (for example, a contract address of a smart contract that needs to be proactively started at a timing moment). Therefore, after receiving the information update transaction, the blockchain node in the blockchain network can update, in response to the information update transaction, the information about the target smart contract recorded in the predetermined blockchain account according to the contract update information included in the information update transaction.

In this implementation, for a method of recording the start moment of the target smart contract, references can also be made to the method of recording the information about the target smart contract. That is, the blockchain node runs the chain code to determine the start moment of the target smart contract. The following provides the details.

In an implementation, the start moment of the target smart contract can be recorded in the chain code, that is, the start moment of the target smart contract is written into the chain code when the chain code is developed. Based on the start moment of the target smart contract recorded in the chain code, the blockchain node can determine the start moment of the target smart contract by running the chain code, and then start the target smart contract when the current moment reaches the start moment. By recording the start moment of the target smart contract in the chain code, the start moment of the target smart contract can be effectively prevented from being maliciously tampered with.

In an implementation, the start moment can be recorded by using a specific predetermined blockchain account, and information about the predetermined blockchain account is recorded in the chain code, that is, the information about the predetermined blockchain account is written into the chain code when the chain code is developed. Based on the information about the predetermined blockchain account recorded in the chain code, the blockchain node can determine the blockchain account by running the chain code, so as to read the start moment of the target smart contract from the blockchain account. By using the above method of recording the start moment of the target smart contract by using the blockchain account, it is convenient to update the start moment of the smart contract that needs to be proactively started at a timing moment, so the blockchain network is controlled to complete the timing task more flexibly.

For example, a moment update transaction used to update the start moment recorded in the predetermined blockchain account can be submitted to the blockchain network, where the moment update transaction includes moment update information (for example, content used to indicate how to update the start moment). Therefore, after receiving the moment update transaction, the blockchain node in the blockchain network can update, in response to the moment update transaction, the start moment of the target smart contract recorded in the predetermined blockchain account according to the contract update information included in the moment update transaction.

Further, to prevent the start moment of the target smart contract in the blockchain account from being maliciously tampered with, permission management can be performed on an operation of the updated start moment. For example, a basis for implementing permission management can be stored in the predetermined blockchain account. For example, the basis can be stored in the predetermined blockchain account in a form of a whitelist, a blacklist, etc. For example, an account address of an administrator of the blockchain network can be recorded in a whitelist. Then, after receiving the moment update transaction, the blockchain node can first read the account address recorded in the "to" field of the moment update transaction (that is, an account address of a user who submits the moment update transaction), and then determine whether the whitelist in the predetermined blockchain account records the account address; and in response to the whitelist in the predetermined blockchain account recording the account address, the above update operation is further performed; and in response to the whitelist in the predetermined blockchain account not recording the account address, the above update operation is prohibited.

It should be noted that in the blockchain network, the blockchain account can include an external account, a contract account, etc. The external account is usually owned by a user (an individual or an institution), while the contract account corresponds to the smart contract deployed in the blockchain. Structures of various accounts are similar, for example, and can include the Nonce field, the Balance field, the Code field, and the Storage field. The value of the Nonce field of each account starts from 0, and the value of the Nonce field increases successively with transactions initiated by the corresponding account, so the Nonce value of each transaction initiated by the account is different, thereby avoiding replay attacks. The Balance field is used to store the balance. The Code field is used to store the code of the smart contract, so the Code field of the external account is usually null. The Storage field is used to store the content of the account. Therefore, data such as the information about the target smart contract, the basis for permission management, and the start moment can be recorded and maintained by using the external account or the contract account.

In an implementation, a smart contract can be pre-deployed in the blockchain network, and a contract account corresponding to the smart contract is used to record and maintain the information about the target smart contract. For example, the information about the target smart contract can be stored in the Storage field of the contract account. In an implementation, an external account can be created in the blockchain network to record and maintain the information about the target smart contract. For example, the information about the target smart contract can be stored in the Storage field of the external account. Certainly, the present specification does not limit the contract account and the field of the contract account to store the information about the target smart contract. For example, the information about the target smart contract can also be stored in any other field, an added field, or an improved field. This is not limited in the present specification.

It should be noted that the predetermined blockchain account that records the information about the target smart contract and the predetermined blockchain account that records the start moment can be a same blockchain account, or can be different blockchain accounts. This is not limited in the present specification.

In this implementation, the blockchain node completes the process of proactively starting the target smart contract at a timing moment by running the timing start logic defined in the chain code. For example, the blockchain node needs to determine whether the current moment reaches the start moment of the target smart contract, so as to start the target smart contract when determining that the current moment reaches the start moment of the target smart contract.

As an example implementation, a moment at which a new block is generated in the blockchain (that is, a moment at which a latest block is generated) can be used as a basis to determine whether the current moment reaches the start moment of the target smart contract. For example, when a new block is generated in the blockchain, a moment at which the block is generated is recorded in a block header of the block as a time stamp. Therefore, whether a new block is generated in the blockchain can be detected. When it is detected that a new block is generated in the blockchain, it can be determined, according to a relationship between a time stamp included in the new block and the start moment, whether the current moment reaches the start moment. For example, a time stamp can be read from a block header of a new block, and then the read time stamp is compared with the start moment to determine a relationship between the read time stamp and the start moment. For example, when the time stamp is the same as the start moment, it is determined that the target smart contract needs to be started (it is understood that the current moment reaches the start moment). Or when the difference between the time stamp and the start moment falls within a determined duration threshold, predetermined or dynamically determined, it is determined that the target smart contract needs to be started. Certainly, a specific implementation in which the time stamp is compared with the start moment to determine whether the current moment reaches the start moment can be flexibly set according to an actual situation. This is not limited in the present specification. It should be noted that, the above logic that determines whether the current moment reaches the start moment can be written into the chain code, for example, written into the timing start logic of the chain code.

In this implementation, the blockchain node can perform, by running the timing start logic, an operation of determining whether the current moment reaches the start moment, and can perform the operation in "real-time." For example, a timer with a determined duration can be configured, and the timing start logic can be configured to start the timer. After the timer expires, it is determined whether the current moment reaches the start moment. In response to the current moment reaching the start moment, the target smart contract is started; and in response to the current moment not reaching the start moment, the timer is reset to continue to determine whether the current moment reaches the start moment after the timer expires.

In this implementation, the target smart contract can be deployed on the blockchain network, that is, belongs to an on-chain contract; or can be deployed in an off-chain node (which does not belong to the blockchain network and is an off-chain device) that is different from the blockchain node, that is, an off-chain contract. The following separately describes processes of starting the target smart contract in the above two implementations.

In an implementation in which the target smart contract is an on-chain contract, after determining that the target smart contract needs to be started, the blockchain node can read the contract code of the target smart contract, so as to execute the read contract code. For the above process, refer to a related part of the implementation shown in FIG. 2. Details are omitted herein for simplicity.

Further, different from the related technology that a blockchain transaction invoking a smart contract indicates to-be-processed data of the smart contract that needs to be processed, there is no blockchain transaction invoking the target smart contract in the process of starting the smart contract in the present specification, that is, to-be-processed data of the target smart contract does not need to be indicated by the blockchain transaction. In an implementation, the to-be-processed data of the target smart contract is off-chain data. Therefore, the blockchain node can obtain the off-chain data by using an oracle mechanism, so as to execute contract code to process the obtained off-chain data. In an implementation, the to-be-processed data of the target smart contract is status data of the target smart contract. Therefore, the blockchain node can obtain the status data stored in the contract account of the target smart contract, so as to execute the contract code to process the obtained status data.

In an implementation in which the target smart contract is an off-chain contract, after determining that the target smart contract needs to be started, the blockchain node can invoke, by using the oracle mechanism, the target smart contract deployed in the off-chain node, so as to instruct the off-chain node to execute the target smart contract, and feedback, to the blockchain node by using the oracle mechanism, an execution result obtained by executing the target smart contract.

When the target smart contract that is to be started at a timing moment is used to implement relatively complex logic, because frequency of timing start is relatively high, a process in which the blockchain node executes the contract code of the target smart contract by using a virtual machine consumes relatively large computing resources, and because all nodes in the blockchain network need to execute the contract code of the target smart contract, consumption of computing resources increases exponentially as a quantity of nodes increases. To solve the above problem, the target smart contract that needs to be started at a timing moment is deployed in an off-chain node, so as to avoid a case in which all the blockchain nodes need to execute the contract code of the target smart contract, and the blockchain node can obtain an execution result from the off-chain node, thereby effectively reducing resource consumption on the blockchain.

Figure 6:
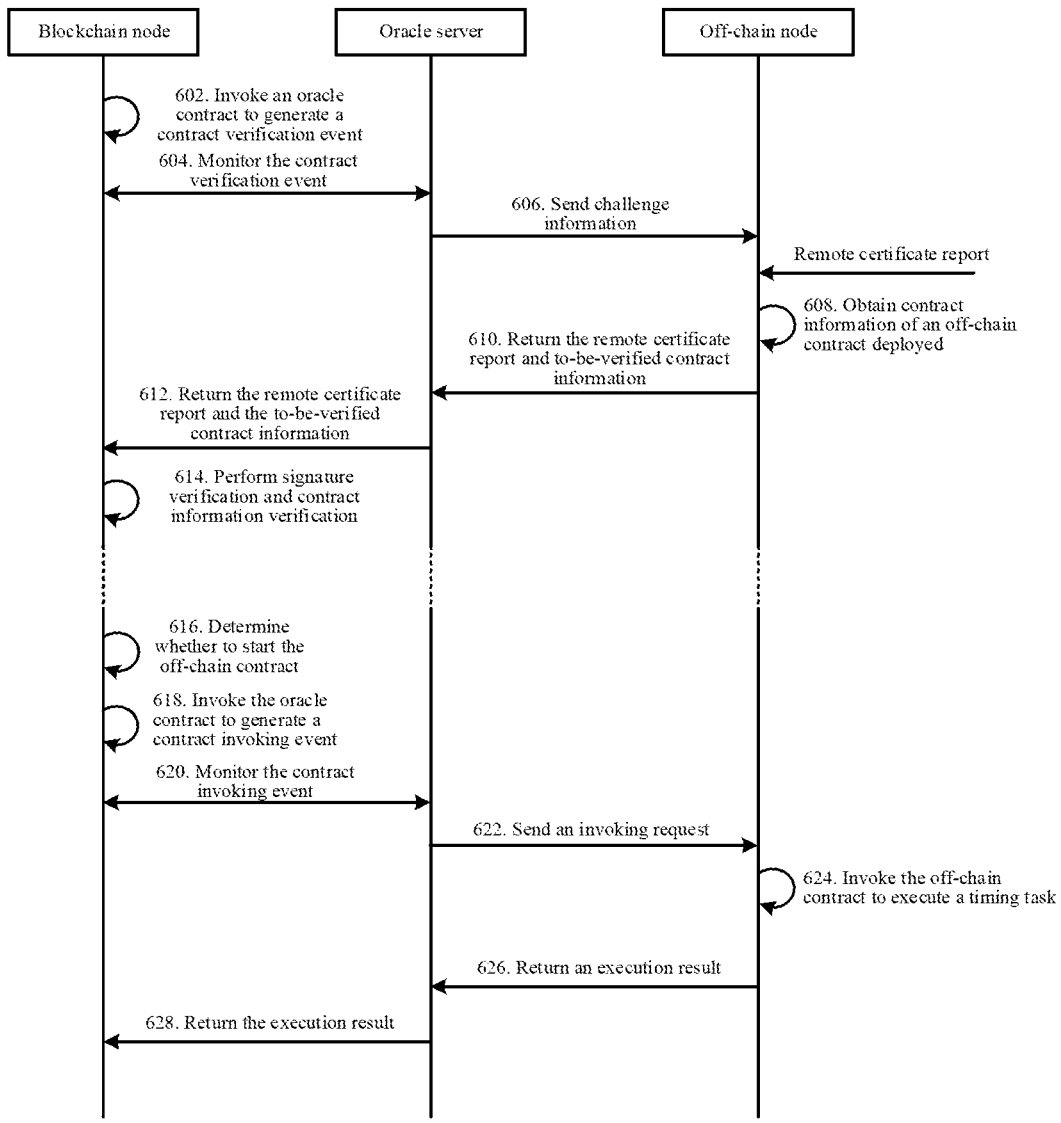
FIG. 6 is an interaction diagram illustrating a method for starting an off-chain contract according to an example implementation.

For ease of understanding, the following describes in detail the solution of starting a smart contract at a timing moment with reference to FIG. 4 to FIG. 6.

For example, a predetermined blockchain account is used to record and maintain a list of target smart contracts (hereinafter referred to as a target smart contract list). The target smart contract list can be stored in a specific predetermined blockchain account, and the list is used to record a contract address of a target smart contract (multiple target smart contracts can exist). In addition, an account address of the predetermined blockchain account is recorded in a chain code. Based on an account address of the predetermined blockchain account recorded in the chain code, a blockchain node can determine the blockchain account by running the chain code, so as to read the contract address of the target smart contract from the target smart contract list stored in the blockchain account. By using the above method of recording the target smart contract list by using the blockchain account, it is convenient to update the target smart contract list, so a blockchain network is controlled to complete a timing task more flexibly. The following describes in detail a process of maintaining a target smart contract list with reference to FIG. 4.

Referring to FIG. 4, FIG. 4 is an interaction diagram of maintaining a target smart contract list according to an example implementation. As shown in FIG. 4, the interaction process can include the following steps:

Step 402: An administrator 40 creates an information update transaction by using a client 41.

In this implementation, a server 42 runs a chain code of a blockchain network, so the server 42 is configured as a blockchain node. The administrator 40 can perform account registration on the server 42 by using the client 41 in advance, to obtain a registered account that is uniquely corresponding to the administrator 40. Then, the administrator 40 can log in to the registered account on the client 41, and the server 42 determines, based on login information of the registered account on the client 41, that a binding relationship is established between the registered account (corresponding to the administrator 40) and the client 41. The binding relationship that needs to be established is a binding relationship between account information of the administrator 40 and device information of the client 41. Based on the binding relationship, the server 42 can confirm that when receiving an information update transaction subsequently submitted by the client 41, the transaction corresponds to the administrator 40.

Step 404: The client 41 submits an information update transaction to the server 42.

In this implementation, the administrator 40 can log in to the registered account on the client 41, and assemble, by using the client 41, an information update transaction that is used to update the target smart contract list stored in the predetermined blockchain account. The information update transaction includes contract update information (updated content for the target smart contract list). For example, the contract update information is used to instruct to add, change, or delete a contract address recorded in the target smart contract list. The administrator 40 then submits the information update transaction to the server 42 by using the client 41.

Step 406: The server 42 reads contract update information.

Step 408: The server 42 updates the target smart contract list.

In this implementation, after receiving the information update transaction, the server 42 (as the blockchain node) can read the contract update information included in the information update transaction in response to the information update transaction, so as to update, according to the contract update information, the target smart contract list stored in the predetermined blockchain account.

Further, to prevent the target smart contract list in the blockchain account from being maliciously tampered with, permission management can be performed on the above operation of updating the target smart contract list. For example, a basis for implementing permission management can be stored in the predetermined blockchain account. For example, the basis can be stored in the predetermined blockchain account in a form of a whitelist, a blacklist, etc. For example, an account address of an administrator of the blockchain network can be recorded in a whitelist. Then, after receiving the information update transaction, the blockchain node can first read the account address recorded in the "to" field of the information update transaction (that is, an account address of a user who submits the information update transaction), and then determine whether the whitelist in the predetermined blockchain account records the account address; and in response to the whitelist in the predetermined blockchain account recording the account address, the above update operation is further performed; and in response to the whitelist in the predetermined blockchain account not recording the account address, the above update operation is prohibited.

In this implementation, for a method of recording and maintaining a start moment of the target smart contract, reference can also be made to the method of recording the target smart contract list, and details are omitted herein for simplicity. A specific form of the start moment of the target smart contract can be flexibly set according to an actual need. For example, it can be set to start the target smart contract at a certain moment according to a predetermined period until a quantity of start times reaches a predetermined quantity of start times. Taking installment repayment as an example, user A needs to repay user B for a total of 12,000 yuan in 12 months and make repayment of 1000 yuan on 12:00 of the 15th in each month. In this scenario, logic of transferring 1000 yuan from user A to user B can be defined in the target smart contract. Assume that the first repayment date is January 15, start moments of the target smart contract are respectively 12:00 of the 15th in January to December.

For an example, the start moment of the target smart contract can be set according to a block height (a block number of a block). For example, a generation moment of a block with a predetermined block height is used as a start moment, that is, when the blockchain network generates a block with the predetermined block height, it is determined that the start moment arrives, and the target smart contract needs to be started. The predetermined block height can be, for example, set to a block height of one or more specific values (for example, a block number 50 or a block number 99), or can be set to a block height that meets a specific condition (for example, an integer multiple of 100 or an integer multiple of 50). This is not limited in the present specification.

It should be noted that in the blockchain network, the blockchain account can include an external account, a contract account, etc. The external account is usually owned by a user (an individual or an institution), while the contract account corresponds to the smart contract deployed in the blockchain. Structures of various accounts are similar, for example, can include the Nonce field, the Balance field, the Code field, and the Storage field. The value of the Nonce field of each account starts from 0, and the value of the Nonce field increases successively with transactions initiated by the corresponding account, so the Nonce value of each transaction initiated by the account is different, thereby avoiding replay attacks. The Balance field is used to store the balance. The Code field is used to store the code of the smart contract, so the Code field of the external account is usually null. The Storage field is used to store the content of the account. Therefore, data such as the target smart contract list, the basis for permission management, and the start moment can be recorded and maintained by using the external account or the contract account.

In an implementation, a smart contract can be pre-deployed in the blockchain network, and a contract account corresponding to the smart contract is used to record and maintain the information about the target smart contract. For example, the information about the target smart contract can be stored in the Storage field of the contract account. In an implementation, an external account can be created in the blockchain network to record and maintain the information about the target smart contract. For example, the information about the target smart contract can be stored in the Storage field of the external account. Certainly, the present specification does not limit the contract account and the field of the contract account to store the information about the target smart contract. For example, the information about the target smart contract can also be stored in any other field, an added field, or an improved field. This is not limited in the present specification.

It should be noted that the predetermined blockchain account that records the information about the target smart contract and the predetermined blockchain account that records the start moment can be a same blockchain account, or can be different blockchain accounts. This is not limited in the present specification.

Referring to FIG. 5, FIG. 5 is a flowchart illustrating a method for starting an on-chain contract according to an example implementation. As shown in FIG. 5, the method is applied in a blockchain node and can include the following steps:

Step 502: Determine an on-chain contract and a start moment.

In this implementation, for a specific implementation process of determining the on-chain contract that needs to be proactively started at a timing moment and the start moment, reference can be made to a related part of the above implementation shown in FIG. 3, and details are omitted herein for simplicity.

Step 504: Determine whether a current moment reaches the start moment; in response to the current moment reaching the start moment, perform step 506; and in response to the current moment not reaching the start moment, perform step 504.

In this implementation, whenever a new block is generated in a blockchain, a time stamp of the new block can be used as a basis to determine whether the current moment reaches the start moment of the on-chain contract. For example, whenever a new block is detected in the blockchain, a time stamp can be read from a block header of the new block, and then the read time stamp is compared with the start moment to determine a relationship between the read time stamp and the start moment. For example, when the time stamp is the same as the start moment, it is determined that the on-chain contract needs to be started (it is understood that the current moment reaches the start moment). Or when the difference between the time stamp and the start moment falls within a determined duration threshold, it is determined that the on-chain contract needs to be started. Certainly, a specific implementation method in which the time stamp is compared with the start moment to determine whether the current moment reaches the start moment can be flexibly set according to an actual situation. This is not limited in the present specification.

It should be noted that the current moment can be directly determined in another method. For example, the blockchain node can directly obtain time recorded by the blockchain node to determine the current moment (which is synchronized with time recorded by another blockchain node), or obtain the current moment from the network, so as to compare the determined current moment with the start moment, so as to start the on-chain contract when the current moment reaches the start moment.

In this implementation, the blockchain node can perform step 504 "in real time." For example, a timer with a determined duration can be configured in the blockchain node. In this case, the blockchain node can start the timer, and after the timer expires, it is determined whether the current moment reaches the start moment. In response to the current moment reaching the start moment, the on-chain contract is started. In response to the current moment not reaching the start moment, the timer is reset to continue to determine whether the current moment reaches the start moment after the timer expires.

Step 506: Read a contract code of the on-chain contract.

In this implementation, because the on-chain contract is deployed in the blockchain network, the blockchain node can directly read the contract code of the on-chain contract.

Step 508: Obtain to-be-processed data.

Step 510: Execute the contract code to process the to-be-processed data.

In this implementation, different from the related technology that a blockchain transaction invoking a smart contract indicates to-be-processed data of the smart contract that needs to be processed, there is no blockchain transaction invoking the on-chain contract in the process of starting the on-chain contract in the present specification, that is, the to-be-processed data of the on-chain contract does not need to be indicated by the blockchain transaction. In an implementation, the to-be-processed data of the on-chain contract is off-chain data. Therefore, the blockchain node can obtain the off-chain data by using an oracle mechanism, so as to execute contract code to process the obtained off-chain data. In an implementation, the to-be-processed data of the on-chain contract is status data of the on-chain contract. Therefore, the blockchain node can obtain the status data stored in the contract account of the on-chain contract, so as to execute the contract code to process the obtained status data.

For example, the on-chain contract is used to perform credit scoring on a user at a timing moment according to service behavior information of the user. Then, the service behavior information of the user can be provided by an off-chain service platform, and the blockchain node can obtain, by using the oracle mechanism, the service behavior information of the user provided by the service platform, so as to execute the contract code of the on-chain contract to process the service behavior information, and calculate a credit score of the user.

For an example, referring to the above example, the credit score of the user belongs to status data of the on-chain contract, and the on-chain contract is further used to issue at a timing moment, to the user according to the credit score of the user, consumption interests that match the credit score. Then, the blockchain node can directly read the credit score stored in the contract account of the on-chain contract, so as to execute the contract code of the on-chain contract to process the credit score and calculate the consumption interests that match the user score.

For an example, the on-chain contract is used to calculate a consumption level of the user at a timing moment according to an account balance of the user, and the status data of the on-chain contract includes the account balance of the user. Then, the blockchain node can directly read the account balance stored in the contract account of the on-chain contract, so as to execute the contract code of the on-chain contract to process the account balance and calculate the consumption level corresponding to the account balance.

For an example, referring to the above-mentioned periodical repayment scenario, the account balance of the user belongs to the status data of the on-chain contract. Before performing a transfer operation, the on-chain contract needs to determine whether the account balance is sufficient to pay a remittance amount of a current transfer operation. Then, the blockchain node can directly read the account balance stored in the on-chain contract, and execute the contract code of the on-chain contract to compare a size relationship between the account balance and the remittance amount, so as to perform the transfer operation if the account balance is not less than the remittance amount.

Referring to FIG. 6, FIG. 6 is an interaction diagram illustrating a method for starting an off-chain contract according to an example implementation. As shown in FIG. 6, the interaction process can include the following steps:

Step 602: The blockchain node invokes an oracle contract to generate a contract verification event.

In this implementation, before invoking an off-chain node to execute a computing task, the blockchain node can first verify whether an off-chain contract deployed on the off-chain node is trustworthy. In addition, a data exchange process between the blockchain node and the off-chain node can be implemented by using the oracle contract in cooperation with an oracle server, and a cooperation mechanism between the oracle contract and the oracle server is an oracle mechanism.

Step 604: The oracle server monitors a contract verification event.

Step 606: The oracle server sends challenge information to the off-chain node.

Step 608: The off-chain node obtains contract information of the off-chain contract deployed.

Step 610: The off-chain node returns a remote certificate report and to-be-verified contract information to the oracle server.

Step 612: The oracle server returns the remote certificate report and the to-be-verified contract information to the blockchain node.

In this implementation, the blockchain node can invoke a pre-deployed oracle contract (for example, a contract address of the oracle contract can be recorded in a chain code). The oracle contract can generate a contract verification event that includes the challenge information, and the oracle server can obtain the challenge information by monitoring the event generated by the oracle contract, and send the challenge information to the off-chain node by using an off-chain channel. After receiving the challenge information, the off-chain node can separately obtain a remote certificate report for a TEE deployed by the off-chain node and contract information (as the to-be-verified contract information) for the off-chain contract deployed by the off-chain node.

The Intel SGX technology is used as an example. The TEE is an enclave created on the off-chain node to implement off-chain computing. A remote certificate process further involves another special enclave on the off-chain node, that is, a quoting enclave (QE), and the QE is an architectural enclave provided and signed by Intel. The enclave first needs to generate a REPORT structure used for local authentication, and the QE verifies, based on the REPORT structure, whether the enclave is on a same platform as the QE. Then, the QE encapsulates the REPORT structure into a structure QUOTE (that is, self-recommendation information), and signs the structure by using an enhanced privacy identification (EPID) key. The EPID key not only represents the platform of the off-chain node, but also represents trustiness of underlying hardware of the off-chain node, and can also bind information such as a version of a processor firmware. In addition, only the QE can access the EPID key, so as to sign the structure QUOTE. In the SGX technology, the above authentication server can be an Intel Attestation Service (IAS) server provided by Intel, and the off-chain node sends the signed structure QUOTE to the IAS server, so the IAS server can verify the signature and return a corresponding remote certificate report to the off-chain node.

After the TEE is created, the off-chain node generates self-recommendation information that is used to implement a remote certificate. The self-recommendation information can be used to anchor and build information about the TEE, so a final remote certificate report that includes the self-recommendation information can be used to represent a status of the TEE, and is used to verify whether the TEE is trustworthy. For example, the self-recommendation information can include a first to-be-verified hash value, and the first to-be-verified hash value is a hash value of predetermined information in the TEE. For example, the predetermined information can include all codes deployed in the TEE, a public key of a developer of the TEE, etc. The Intel SGX technology is used as an example. The hash value generated for all the codes deployed in the TEE is MREnclave, and a hash value generated for the public key of the developer of the TEE is MRSigner, that is, the first to-be-verified hash value can include MREnclave and MRSigner.

The Intel SGX technology is still used as an example. As described above, after the off-chain node sends the signed structure QUOTE to the IAS server, the IAS server performs signature verification according to a maintained public key set, and returns a remote certificate report (that is, an AVR report) to the off-chain node. The remote certificate report includes the structure QUOTE and a signature verification result, and the IAS server signs the remote certificate report by using a private key held by the IAS server.

Accordingly, after obtaining the remote certificate report, the blockchain node can first perform signature verification on the remote certificate report according to the public key of the IAS server, and if the verification succeeds, it indicates that the remote certificate report is actually generated by the IAS server and is not tampered with or has lost data in a data transmission process. The blockchain node can obtain the public key of the IAS server in any way. For example, when the remote certificate report is provided to the blockchain node, a certificate chain that provides the IAS can be associated, so the blockchain node can extract the public key of the IAS server from the certificate chain. The blockchain node can then extract the structure QUOTE and the signature verification result from the remote certificate report. The blockchain node can first view the signature verification result. If the signature verification result is that the verification succeeds, it indicates that a CPU of the off-chain node has a private key provided by Intel. Therefore, the TEE is established on a reliable hardware platform, and another verification operation can be continued. If the signature verification result is that the verification fails, the blockchain node can determine that an off-chain privacy computing platform is unreliable, and no further verification operation is required. Then, the blockchain node can extract the above hash values MREnclave and MRSigner from the structure QUOTE, that is, to-be-verified MREnclave and to-be-verified MRSigner. In addition, the blockchain node obtains a first standard hash value of the predetermined information of the TEE in advance, for example, trusted values of MREnclave and MRSigner (hereinafter referred to as trusted MREnclave and trusted MRSigner), compares the to-be-verified MREnclave with the trusted MREnclave, and compares the to-be-verified MRSigner with the trusted MRSigner. In this case, the blockchain node can use "the to-be-verified MREnclave is consistent with the trusted MREnclave, and the to-be-verified MRSigner is consistent with the trusted MRSigner" as a prerequisite for determining that the TEE is trustworthy. In other words, if the to-be-verified MREnclave is inconsistent with the trusted MREnclave, or the to-be-verified MRSigner is inconsistent with the trusted MRSigner, the blockchain node determines that the TEE of the off-chain node is unreliable. If all prerequisites specified by the blockchain node are met, it can be determined that the TEE of the off-chain node is trustworthy. In addition, there is no inevitable sequence between the operation performed by the blockchain node on the signature verification result and the operation performed on the to-be-verified MREnclave and the to-be-verified MRSigner, and the two can be completely independent of each other.

Step 614: The blockchain node performs signature verification and contract information verification.

When determining, according to the remote certificate report, that the TEE of the off-chain node is trustworthy, the blockchain node obtains the to-be-verified contract information of the off-chain contract deployed on the off-chain node. The to-be-verified contract information is signed by the off-chain node in the TEE by using an identity private key of the off-chain node, and the identity private key is generated by the off-chain node in the TEE and maintained in the TEE. For example, the off-chain node can read the deployed off-chain contract into the TEE and sign the contract by using the identity private key of the off-chain node.

The blockchain node performs signature verification on the to-be-verified contract information by using the identity public key of the off-chain node, and performs contract information verification on the to-be-verified contract information according to the contract information of the off-chain node. The identity public key is disclosed, for example, when the off-chain node publishes the identity public key, which can be obtained by the blockchain node. In addition, the contract information of the off-chain contract can also be disclosed. For example, a party deploying the off-chain contract publishes the contract information, which can be obtained by the blockchain node. The contract information can include information such as a name, a description, a version number, a bytecode hash value, and a contract identity public key of the off-chain contract. This is not limited in the present specification.

In an implementation in which signature verification and contract information verification succeed, the blockchain node can determine that when the blockchain node invokes the off-chain contract by using the oracle mechanism, the off-chain contract is executed by the off-chain node in the TEE. In the present specification, in the process of verifying the off-chain contract, it is first verified that the TEE of the off-chain node is trustworthy. In an implementation in which it is verified that the TEE of the off-chain node is trustworthy, if it is obtained during signature verification that the to-be-verified contract information provided by the off-chain node is actually signed by the identity private key (maintained in the TEE) of the off-chain node, it can be determined that the currently challenged off-chain contract is an off-chain contract running in the TEE of the off-chain node. Then in an implementation in which verification on the to-be-verified contract information succeeds, it indicates that the contract information of the off-chain contract running in the TEE of the off-chain node is correct, so as to finally determine that the off-chain contract deployed on the off-chain node is trustworthy, and a computing task can be performed as expected.

Step 616: The blockchain node determines whether to start the off-chain contract.

In this implementation, for a specific implementation process in which the blockchain node determines whether to start the off-chain contract, references can be made to related parts of the above implementations shown in FIG. 3 and FIG. 5. Details are omitted herein for simplicity.

Step 618: The blockchain node invokes the oracle contract to generate a contract invoking event.

In this implementation, the to-be-processed data of the off-chain contract can be on-chain data, or can be off-chain data. For example, the on-chain data can be data in a block, or data stored in a blockchain account. In an implementation in which the to-be-processed data is on-chain data, the blockchain node can write the on-chain data itself into the contract invoking event, so the off-chain node obtains the on-chain data from the contract invoking event. Or the blockchain node can write description information of the on-chain data into the contract invoking event, so the off-chain node obtains the description information from the contract invoking event, and further obtains the corresponding on-chain data from the blockchain network according to the description information. When the to-be-processed data is off-chain data, the off-chain node obtains the to-be-processed data from a data provider.

In this implementation, the contract invoking event includes an encrypted invoking request, and the invoking request is used to instruct the off-chain node to execute the off-chain contract. For example, the invoking request includes the contract address of the off-chain contract. The invoking request can be encrypted by using symmetric encryption, asymmetric encryption, or a combination of symmetric encryption and asymmetric encryption, so as to ensure that content of the invoking request is not disclosed in a transmission process. For content of this part, references can be made to applications in the related technology, and details are omitted herein for simplicity. Then, the off-chain node can decrypt the invoking request in the TEE maintained by the off-chain node, so as to respond to the invoking request.

Step 620: The oracle server monitors the contract invoking event.

Step 622: The oracle server sends an invoking request to the off-chain node.

Step 624: The off-chain node invokes the off-chain contract to execute a timing task.

In this implementation, the off-chain node obtains to-be-processed data of the off-chain contract, and processes the to-be-processed data by executing the contract code of the off-chain contract, so as to complete the timing task.

Step 626: The off-chain node returns an execution result to the oracle server.

Step 628: The oracle server returns the execution result to the blockchain node.

Corresponding to the above method implementation, the present specification further provides an implementation of an apparatus for starting a smart contract.

Figure 7:
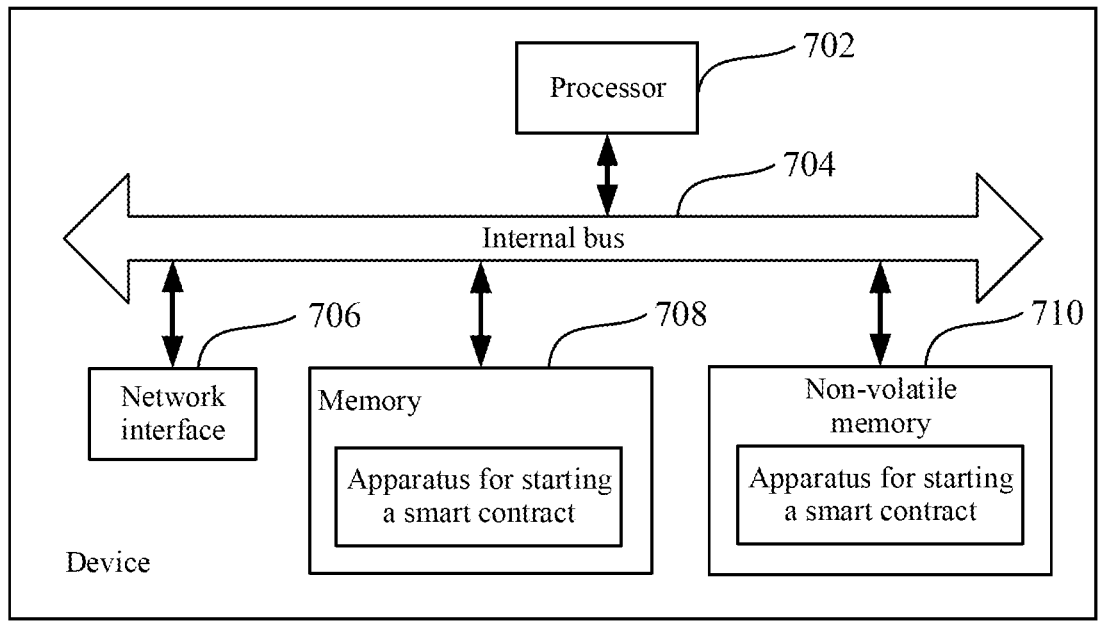
FIG. 7 is a schematic structural diagram illustrating a device, according to an example implementation.

FIG. 7 is a schematic structural diagram illustrating a device, according to an example implementation. Referring to FIG. 7, in terms of hardware, the device includes a processor 702, an internal bus 704, a network interface 706, a memory 708, and a non-volatile memory 710, and certainly can further include hardware needed by other services. The processor 702 reads a corresponding computer program from the non-volatile memory 710 to the memory 708, and then runs the computer program to form an apparatus for starting a smart contract at a logical level. Certainly, in addition to a software implementation method, one or more implementations of the present specification do not exclude another implementation method, such as a logic device or a combination of software and hardware, that is, execution bodies of the following processing procedures are not limited to each logical unit, or can be hardware or a logic device.

Figure 8:
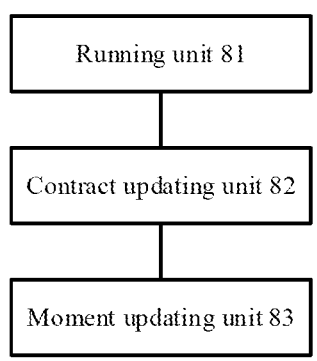
FIG. 8 is a block diagram illustrating an apparatus for starting a smart contract according to an example implementation.

Referring to FIG. 8, in a software implementation, the apparatus for starting a smart contract is applied in a blockchain node and can include: a running unit 81, configured to: run a timing start logic defined in a chain code, the timing start logic configured to determine a start moment of a target smart contract, and start the target smart contract when a current moment reaches the start moment.

In some implementations, the chain code records information about the target smart contract; or the chain code records information about a predetermined blockchain account, and the predetermined blockchain account records information about the target smart contract.

In some implementations, the apparatus further includes: a contract updating unit 82, configured to update, according to contract update information included in a received information update transaction, the information about the target smart contract recorded in the predetermined blockchain account.

In some implementations, the chain code records the start moment; or the chain code records information about a predetermined blockchain account, and the predetermined blockchain account records the start moment.

In some implementations, the apparatus further includes: a moment updating unit 83, configured to update, according to moment update information included in a received moment update transaction, the start moment of the target smart contract recorded in the predetermined blockchain account.

In some implementations, the timing start logic is configured to: in response to a new block being detected in a blockchain, determine, according to a relationship between a time stamp included in the new block and the start moment, whether the current time reaches the start moment.

In some implementations, the timing start logic is configured to: start a timer of a determined duration; after the timer expires, determine whether the current moment reaches the start moment; in response to the current moment reaching the start moment, start the target smart contract; and in response to the current moment not reaching the start moment, reset the timer.

In some implementations, the running unit 81 is, for example, configured to: obtain a contract code of the target smart contract, and execute the contract code.

In some implementations, the running unit 81 is further configured to: obtain off-chain data by using an oracle mechanism, and execute the contract code to process the off-chain data; or obtain status data in a contract account of the target smart contract, and execute the contract code to process the status data.

In some implementations, the running unit 81 is, for example, configured to: invoke the target smart contract deployed in an off-chain node by using an oracle mechanism, an execution result obtained by the off-chain node by executing the target smart contract being fed back by the off-chain node to the blockchain node by using the oracle mechanism.

The system, apparatus, module, or unit illustrated in the implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

To provide further context for embodiments of this specification, and as introduced herein, distributed ledger systems (DLSs) (which can also be referred to as consensus networks, made up of peer-to-peer nodes), and blockchain networks, enable participating entities to securely, and immutably, conduct transactions and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, the recording of transactions on a blockchain is reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. Within a block, the transactions, which have already been verified by the nodes of the blockchain network, are hashed and encoded into a Merkle tree. The Merkle tree is a data structure in which each leaf node includes a hash on a corresponding transaction, and each non-leaf node includes a hash on the concatenation of the hashes in its children. With this process continuing up the tree to the root of the entire tree, the root node includes a hash that is representative of all data in the tree. A hash purporting to be of a transaction stored in the tree can be quickly verified by determining whether it is consistent with the structure of the tree.

Where a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. However, embodiments of this specification can be realized in any appropriate type of blockchain network.

In general, a consortium blockchain network is private among the participating entities. In a consortium blockchain network, the consensus process is controlled by an authorized set of nodes, referred to as consensus nodes, one or more of which are operated by a respective entity (a financial institution, insurance company, etc.). For example, a consortium of ten (10) entities (financial institutions, insurance companies, etc.) can operate a consortium blockchain network, each of which operates at least one node in the consortium blockchain network.

In some examples, within a consortium blockchain network, a global blockchain is provided as a blockchain that is replicated across all nodes. That is, all consensus nodes are typically in perfect state consensus with respect to the global blockchain. To achieve consensus (agreement on the addition of a block to a blockchain), a consensus protocol or algorithm is implemented within the consortium blockchain network. For example, the consortium blockchain network can implement a practical Byzantine fault tolerance (PBFT) consensus, described in further detail below.

Figure 9:
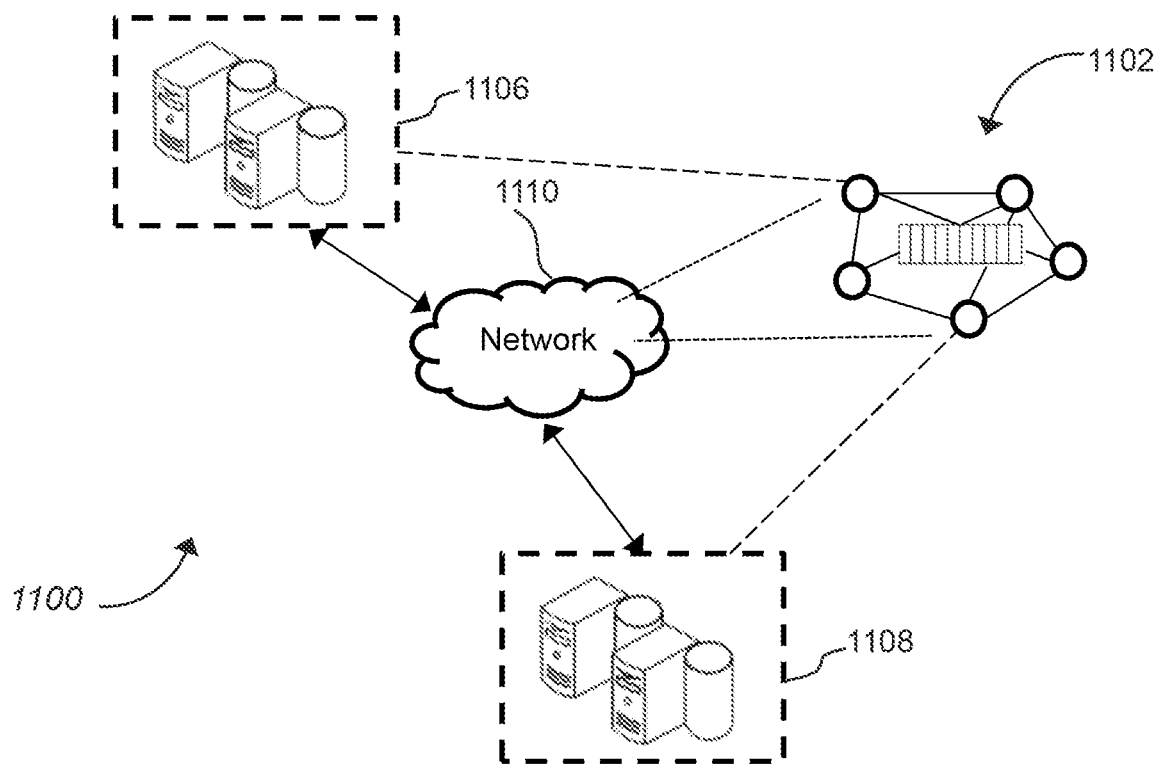
FIG. 9 is a diagram illustrating example environments that can be used to execute embodiments of this specification.

FIG. 9 is a diagram illustrating an example of an environment 1100 that can be used to execute embodiments of this specification. In some examples, the environment 1100 enables entities to participate in a consortium blockchain network 1102. The environment 1100 includes a plurality of computing devices 1106, 1108, and a network 1110. In some examples, the network 1110 includes a local area network (LAN), wide area network (WAN), the Internet, or a combination thereof, and connects web sites, user devices (computing devices), and back-end systems. In some examples, the network 1110 can be accessed over a wired and/or a wireless communications link. In some examples, the network 1110 enables communication with, and within the consortium blockchain network 1102. In general the network 1110 represents one or more communication networks. In some cases, the network 1110 includes network hardware such as switches, routers, repeaters, electrical cables and optical fibers, light emitters and receivers, radio transmitters and receivers, and the like. In some cases, the computing devices 1106, 1108 can be nodes of a cloud computing system (not shown), or each computing device 1106, 1108 can be a separate cloud computing system including a number of computers interconnected by a network and functioning as a distributed processing system.

In the depicted example, the computing systems 1106, 1108 can each include any appropriate computing system that enables participation as a node in the consortium blockchain network 1102. Examples of computing devices include, without limitation, a server, a desktop computer, a laptop computer, a tablet computing device, and a smartphone. In some examples, the computing systems 1106, 1108 host one or more computer-implemented services for interacting with the consortium blockchain network 1102. For example, the computing system 1106 can host computer-implemented services of a first entity (user A), such as a transaction management system that the first entity uses to manage its transactions with one or more other entities (other users). The computing system 1108 can host computer-implemented services of a second entity (user B), such as a transaction management system that the second entity uses to manage its transactions with one or more other entities (other users). In the example of FIG. 9, the consortium blockchain network 1102 is represented as a peer-to-peer network of nodes, and the computing systems 1106, 1108 provide nodes of the first entity and second entity, respectively, which participate in the consortium blockchain network 1102.

Figure 10:
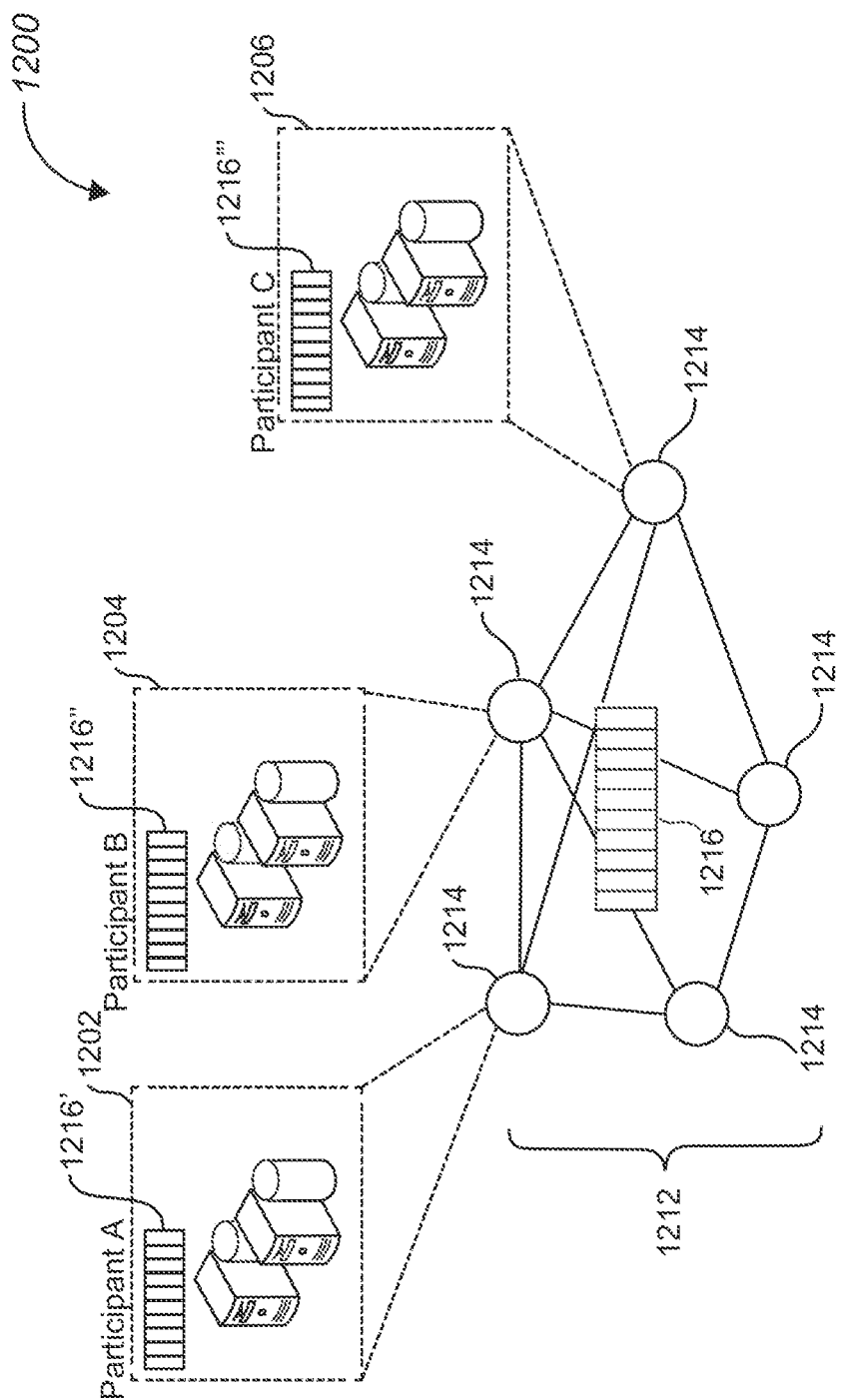
FIG. 10 is a diagram illustrating an example architecture in accordance with embodiments of this specification.

FIG. 10 depicts an example architecture 1200 in accordance with embodiments of this specification. The example architecture 1200 includes participant systems 1202, 1204, 1206 that correspond to Participant A, Participant B, and Participant C, respectively. Each participant (user, enterprise, etc.) participates in a blockchain network 1212 provided as a peer-to-peer network including a plurality of nodes 1214, at least some of which immutably record information in a blockchain 1216. Although a single blockchain 1216 is schematically depicted within the blockchain network 1212, multiple copies of the blockchain 1216 are provided, and are maintained across the blockchain network 1212, as described in further detail herein.

In the depicted example, each participant system 1202, 1204, 1206 is provided by, or on behalf of, Participant A, Participant B, and Participant C, respectively, and functions as a respective node 1214 within the blockchain network 1212. As used herein, a node generally refers to an individual system (computer, server, etc.) that is connected to the blockchain network 1212, and enables a respective participant to participate in the blockchain network. In the example of FIG. 10, a participant corresponds to each node 1214. It is contemplated, however, that a participant can operate multiple nodes 1214 within the blockchain network 1212, and/or multiple participants can share a node 1214. In some examples, the participant systems 1202, 1204, 1206 communicate with, or through, the blockchain network 1212 using a protocol (hypertext transfer protocol secure (HTTPS)), and/or using remote procedure calls (RPCs).

Nodes 1214 can have varying degrees of participation within the blockchain network 1212. For example, some nodes 1214 can participate in the consensus process (as miner nodes that add blocks to the blockchain 1216), while other nodes 1214 do not participate in the consensus process. As another example, some nodes 1214 store a complete copy of the blockchain 1216, while other nodes 1214 only store copies of portions of the blockchain 1216. For example, data access privileges can limit the blockchain data that a respective participant stores within its respective system. In the example of FIG. 10, the participant systems 1202, 1204 store respective, complete copies 1216', 1216", 1216''' of the blockchain 1216. In the descriptions herein, nodes 1214 of the blockchain network 1212 are also referred to as "participant user" for descriptive purposes. In some embodiments, some or all of the participant users 1214 participate in the consensus process and are referred to as "consensus nodes." The consensus nodes for the blockchain 1216 may also include other nodes not selected from the participant users 1214. In some other embodiments, consensus nodes for adding blocks to the blockchain 1216 do not overlap with the participant users 1214 that propose blocks to be added to the blockchain 1216.

A blockchain, such as the blockchain 1216 of FIG. 10, is made up of a chain of blocks, each block storing data. Examples of data include transaction data representative of a transaction between two or more participants. While transactions are used herein by way of non-limiting example, any appropriate data can be stored in a blockchain (documents, images, video, audio, etc.). Examples of a transaction can include, without limitation, exchanges of something of value (assets, products, services, currency, etc.) or occurrence of some events or activities. The transaction data is immutably stored within the blockchain. That is, an undetectable change cannot be made to the transaction data.

Before being stored in a block, the transaction data is hashed. Hashing is a process of transforming the transaction data, typically provided as string data, into a fixed-length hash value, typically provided as string data. It is not possible to un-hash the hash value to obtain the transaction data. Hashing ensures that even a slight change in the transaction data results in a completely different hash value. Further, and as noted above, the hash value is of a fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, for example, the consensus node generates a block header, hashes all of the transactions in the block, and combines the hash value in pairs to generate further hash values until a single hash value is provided for all transactions in the block (the Merkle root hash). This Merkle root hash is added to the block header. The consensus node also determines the hash value of the most recent block in the blockchain (the last block added to the blockchain) and adds the hash value of the most recent block into the block header. The consensus node also adds a nonce value, and a timestamp to the block header. The block header is hashed, which becomes the hash value of the block.

In general, PBFT provides a practical Byzantine state machine replication that tolerates Byzantine faults (malfunctioning nodes, malicious nodes, etc.). This is achieved in PBFT by assuming that faults will occur (assuming the existence of independent node failures, and/or manipulated messages sent by consensus nodes). In PBFT, the consensus nodes are provided in a sequence that includes a primary consensus node and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node and verifies that the message was not modified during transmission.

In PBFT, the consensus protocol is provided in multiple phases with all consensus nodes beginning in the same state. To begin, a client sends a request to the primary consensus node to invoke a service operation (execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

A consensus algorithm refers to a specific mechanism or terms, based on which a transaction or a block is verified and validated to be added into a blockchain. To that extent, a consensus algorithm is viewed as a specific implementation agreement adapted to follow rules of a consensus protocol. Different consensus algorithms may be created for different blockchain networks 1212 or different blockchains 1216, which all comply with a same consensus protocol.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can encrypt/decrypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 10, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 10, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

In a typical configuration, the computer includes one or more processors (CPU), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a cassette magnetic tape, a magnetic disk storage, a quantum memory, a graphene-based storage medium, another magnetic storage device, or any other non-transmission medium. The computer storage medium can be used to store information accessible by a computing device. Based on the definition in the present specification, the computer readable medium does not include transitory media such as a modulated data signal and carrier.

It is also worthwhile to note that terms "include," "comprise" or any other variant thereof is intended to cover non-exclusive inclusion, so processes, methods, products or devices that include a series of elements include not only those elements but also other elements that are not explicitly listed, or elements inherent in such processes, methods, products or devices. An element described by "includes a . . . " further includes, without more constraints, another identical element in the process, method, product, or device that includes the element.

Specific implementations of the present specification are described above. Other implementations fall within the scope of the appended claims. In some situations, the actions or steps described in the claims can be performed in an order different from the order in the implementation and the desired results can still be achieved. In addition, the process depicted in the accompanying drawings does not necessarily require a particular execution order to achieve the desired results. In some implementations, multi-tasking and parallel processing can be advantageous.

The terms used in one or more implementations of the present specification are merely for illustrating specific implementations, and are not intended to limit one or more implementations of the present specification. The terms "a" and "the" of singular forms used in one or more implementations of the present specification and the appended claims are also intended to include plural forms, unless otherwise specified in the context clearly. It should be further understood that the term "and/or" used in the present specification indicates and includes any or all possible combinations of one or more associated listed items.

It should be understood that although terms "first," "second," "third," etc., can be used in one or more implementations of the present specification to describe various types of information, the information is not limited to the terms. These terms are merely used to differentiate between information of the same type. For example, without departing from the scope of one or more implementations of the present specification, first information can also be referred to as second information, and similarly, the second information can be referred to as the first information. Depending on the context, for example, the word "if" used herein can be explained as "while," "when," or "in response to determining."

The above descriptions are merely preferred implementations of one or more implementations of the present specification, and are not intended to limit one or more implementations of the present specification. Any modification, equivalent replacement, improvement, etc., made without departing from the spirit and principles of one or more implementations of the present specification shall fall within the protection scope of one or more implementations of the present specification.

The various embodiments described above can be combined to provide further embodiments. Aspects of the embodiments can be modified, if necessary, to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for automatically starting a smart contract, the method comprising:
   configuring a chaincode of a blockchain network to include a timing start logic, the timing start logic configured to determine a start moment of executing a target smart contract of program codes deployed in the blockchain network via a blockchain account with the blockchain network that storing the start moment of executing the target smart contract;
   reading a time stamp of a block that is generated in the blockchain network to determine a time moment at which the block is generated;
   determining the time moment read from the time stamp as a current time moment;
   running, by a node of the blockchain network, the timing start logic included in the chain code based on the current time moment; and
   before the target smart contract has been invoked by a blockchain transaction, automatically starting to execute the program codes of the target smart contract in response to the timing start logic determining that the current time moment reaches the start moment.

2. The method according to claim 1, wherein the chain code records one or more of:
   information about the target smart contract; or
   information about the blockchain account with the blockchain network, the blockchain account recording information about the target smart contract.

3. The method according to claim 2, in a case that the chain code records the information about the blockchain account, comprising:
   receiving, by the node, an information update transaction that includes contract update information of the target smart contract; and
   updating, by the node and according to the contract update information, the information about the target smart contract recorded in the blockchain account.

4. The method according to claim 1, comprising:
   receiving, by the node, a moment update transaction that includes moment update information of the target smart contract; and
   updating, by the node and according to the moment update information, the start moment of the target smart contract recorded in the blockchain account.

5. The method according to claim 1, wherein the timing start logic is configured to:
   start a timer of a determined duration;
   after the timer expires, determine whether the current moment reaches the start moment;
   in response to the current moment reaching the start moment, start the target smart contract; and
   in response to the current moment not reaching the start moment, reset the timer.

6. The method according to claim 1, wherein the starting the target smart contract includes:
   obtaining a program code of the program codes of the target smart contract, and executing the program code.

7. The method according to claim 6, wherein the executing the program code includes one or more of:
   obtaining off-chain data by using an oracle mechanism, and executing the program code to process the off-chain data; or
   obtaining status data in a contract account of the target smart contract, and executing the program code to process the status data.

8. The method according to claim 1, wherein the starting to execute the target smart contract includes:
   invoking the target smart contract deployed in an off-chain node by using an oracle mechanism, and receiving an execution result from the off-chain node by using the oracle mechanism.

9. An electronic device, comprising:
   a processor; and
   a memory communicatively coupled to the processor and having executable instructions stored thereon, the executable instructions, when executed by the processor, enable the processor to implement acts including:
   configuring a chaincode of a blockchain network to include a timing start logic, the timing start logic configured to determine a start moment of executing a target smart contract of program codes deployed in the blockchain network via a blockchain account with the blockchain network that storing the start moment of executing the target smart contract;
   reading a time stamp of a block that is generated in the blockchain network to determine a time moment at which the block is generated;
   determining the time moment read from the time stamp as a current time moment;
   running, by a node of the blockchain network, the timing start logic included in the chain code based on the current time moment; and
   before the target smart contract has been invoked by a blockchain transaction, automatically starting to execute the program codes of the target smart contract in response to the timing start logic determining that the current time moment reaches the start moment.

10. The device according to claim 9, wherein the chain code records one or more of:
    information about the target smart contract; or
    information about the blockchain account with the blockchain network, the blockchain account recording information about the target smart contract.

11. The device according to claim 10, wherein in a case that the chain code records the information about the blockchain account, the acts include:
    receiving an information update transaction that includes contract update information of the target smart contract; and
    updating, according to the contract update information, the information about the target smart contract recorded in the blockchain account.

12. The device according to claim 9, wherein the acts include:
    receiving a moment update transaction that includes moment update information of the target smart contract; and
    updating, according to the moment update information, the start moment of the target smart contract recorded in the blockchain account.

13. The device according to claim 9, wherein the timing start logic is configured to:
    start a timer of a determined duration;
    after the timer expires, determine whether the current moment reaches the start moment;
    in response to the current moment reaching the start moment, start the target smart contract; and
    in response to the current moment not reaching the start moment, reset the timer.

14. The device according to claim 9, wherein the starting to execute the target smart contract includes:
   invoking the target smart contract deployed in an off-chain node by using an oracle mechanism, and
   receiving an execution result from the off-chain node by using the oracle mechanism.

15. A non-transitory computer readable storage medium storing computer instructions, which, when being executed by a processor, enable the processor to implement operations including:
   configuring a chaincode of a blockchain network to include a timing start logic, the timing start logic configured to determine a start moment of executing a target smart contract of program codes deployed in the blockchain network via a blockchain account with the blockchain network that storing the start moment of executing the target smart contract;
   reading a time stamp of a block that is generated in the blockchain network to determine a time moment at which the block is generated;
   determining the time moment read from the time stamp as a current time moment;
   running, by a node of the blockchain network, the timing start logic included in the chain code based on the current time moment; and
   before the target smart contract has been invoked by a blockchain transaction, automatically starting to execute the program codes of the target smart contract in response to the timing start logic determining that the current time moment reaches the start moment.

16. The storage medium according to claim 15, wherein the starting the target smart contract includes:
   obtaining a program code of the program codes of the target smart contract; and
   executing the program code through one or more of:
      obtaining off-chain data by using an oracle mechanism, and executing the program code to process the off-chain data; or
      obtaining status data in a contract account of the target smart contract, and executing the program code to process the status data.

17. The storage medium according to claim 15, wherein the chain code records one or more of:
   information about the blockchain account with the blockchain network, the blockchain account recording information about the target smart contract.

18. The storage medium according to claim 17, wherein the operations include:
   receiving, by the node, an information update transaction that includes contract update information of the target smart contract; and
   updating, by the node and according to the contract update information, the information about the target smart contract recorded in the blockchain account.

19. The storage medium according to claim 15, wherein the operations include:
   receiving, by the node, a moment update transaction that includes moment update information of the target smart contract; and
   updating, by the node and according to the moment update information, the start moment of the target smart contract recorded in the blockchain account.

20. The storage medium according to claim 15, wherein the timing start logic is configured to:
   start a timer of a determined duration;
   after the timer expires, determine whether the current moment reaches the start moment;
   in response to the current moment reaching the start moment, start the target smart contract; and
   in response to the current moment not reaching the start moment, reset the timer.

* * * * *